United States Patent
Janzer et al.

(10) Patent No.: US 11,354,877 B2
(45) Date of Patent: Jun. 7, 2022

(54) COMPARATIVE VIRTUAL ASSET ADJUSTMENT SYSTEMS AND METHODS

(71) Applicant: DG Holdings, Inc., Salt Lake City, UT (US)

(72) Inventors: Jesse Janzer, Sandy, UT (US); Jon Middleton, Salt Lake City, UT (US); Berkley Frei, Salt Lake City, UT (US)

(73) Assignee: DG Holdings, Inc., Salt Lake City, UT (US)

(*) Notice: Subject to any disclaimer, the term of this patent is extended or adjusted under 35 U.S.C. 154(b) by 0 days.

(21) Appl. No.: 17/154,846

(22) Filed: Jan. 21, 2021

(65) Prior Publication Data

US 2021/0209863 A1 Jul. 8, 2021

Related U.S. Application Data

(63) Continuation of application No. 15/798,173, filed on Oct. 30, 2017, now Pat. No. 10,930,086.

(60) Provisional application No. 62/415,808, filed on Nov. 1, 2016.

(51) Int. Cl.
| | | |
|---|---|---|
| *G06T 19/20* | (2011.01) | |
| *G06F 8/34* | (2018.01) | |
| *G06T 13/40* | (2011.01) | |
| *G06T 15/50* | (2011.01) | |
| *G06T 17/20* | (2006.01) | |
| *G06T 17/00* | (2006.01) | |

(52) U.S. Cl.
CPC ............... *G06T 19/20* (2013.01); *G06F 8/34* (2013.01); *G06T 13/40* (2013.01); *G06T 15/503* (2013.01); *G06T 17/005* (2013.01); *G06T 17/20* (2013.01); *G06T 2213/08* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 7,184,047 B1 | 2/2007 | Crampton | |
| 8,471,843 B2* | 6/2013 | Finn | A63F 13/525 |
| | | | 715/744 |
| 8,522,330 B2 | 8/2013 | Shuster et al. | |
| 8,739,047 B1 | 5/2014 | Holler et al. | |
| 9,501,751 B1 | 11/2016 | Holler et al. | |
| 9,569,445 B2 | 2/2017 | Flores et al. | |
| 10,217,185 B1* | 2/2019 | Cabanero | G06F 16/13 |
| 10,970,843 B1* | 4/2021 | Olsen | G06T 7/0046 |
| 2008/1078147 | 7/2008 | Meliksetian et al. | |
| 2009/0048981 A1 | 2/2009 | McBain | |

(Continued)

OTHER PUBLICATIONS

International Search Report and Written Opinion dated Jan. 9, 2018 for PCT/US2017/059083.

(Continued)

*Primary Examiner* — James A Thompson
(74) *Attorney, Agent, or Firm* — R. Whitney Johnson

(57) ABSTRACT

The present disclosure illustrates systems and methods for automatically adjusting a following 3D asset based on a deformation of a related base 3D asset. The systems and methods may use geomaps to index the relationship between the following 3D asset and base 3D asset. By automatically adjusting a following 3D asset based on the base 3D asset, the following 3D asset may retain full functionality.

20 Claims, 3 Drawing Sheets

(56) References Cited

U.S. PATENT DOCUMENTS

| | | |
|---|---|---|
| 2009/0135176 A1 | 5/2009 | Snoddy et al. |
| 2010/0203968 A1 | 8/2010 | Gill et al. |
| 2012/0190458 A1 | 7/2012 | Gerson et al. |
| 2013/0275886 A1 | 10/2013 | Haswell et al. |
| 2014/0132633 A1 | 5/2014 | Fekete et al. |
| 2015/0024852 A1 | 1/2015 | Pacey et al. |
| 2015/0379025 A1 | 12/2015 | Flores et al. |
| 2015/0379427 A1 | 12/2015 | Dirac et al. |
| 2016/0088284 A1 | 3/2016 | Sareen et al. |
| 2017/0039765 A1 | 2/2017 | Zhou et al. |
| 2017/0206707 A1 | 7/2017 | Guay et al. |
| 2018/0122148 A1 | 5/2018 | Janzer et al. |

OTHER PUBLICATIONS

Janzer, et al., Notice of Allowance dated Oct. 21, 2020 for U.S. Appl. No. 15/793,173.
Janzer, et al., Office Action dated Dec. 13, 2019 for U.S. Appl. No. 15/798,173.
Janzer, et al., Office Action dated Jan. 31, 2019 for U.S. Appl. No. 15/798,173.
Janzer, et al., Office Action dated Jun. 3, 2019 for U.S. Appl. No. 15/798,173.
Janzer, et al., Office Action dated May 20, 2020 for U.S. Appl. No. 15/798,173.

* cited by examiner

COMPARATIVE VIRTUAL ASSET ADJUSTMENT SYSTEMS AND METHODS

RELATED APPLICATIONS

This application is a continuation of U.S. patent application Ser. No. 15/798,173, filed Oct. 30, 2017, which claims the benefit under 35 U.S.C. § 119(e) of U.S. Provisional Application No. 62/415,808 filed Nov. 1, 2016, each of which is hereby incorporated by reference herein in its entirety.

TECHNICAL FIELD

The present disclosure relates to electronic or other virtual representations of an individual or entity in a computer generated environment. In particular, the present disclosure relates to systems and methods for portable and persistent virtual identity across applications and platforms.

DETAILED DESCRIPTION OF PREFERRED EMBODIMENTS

Figure 1:
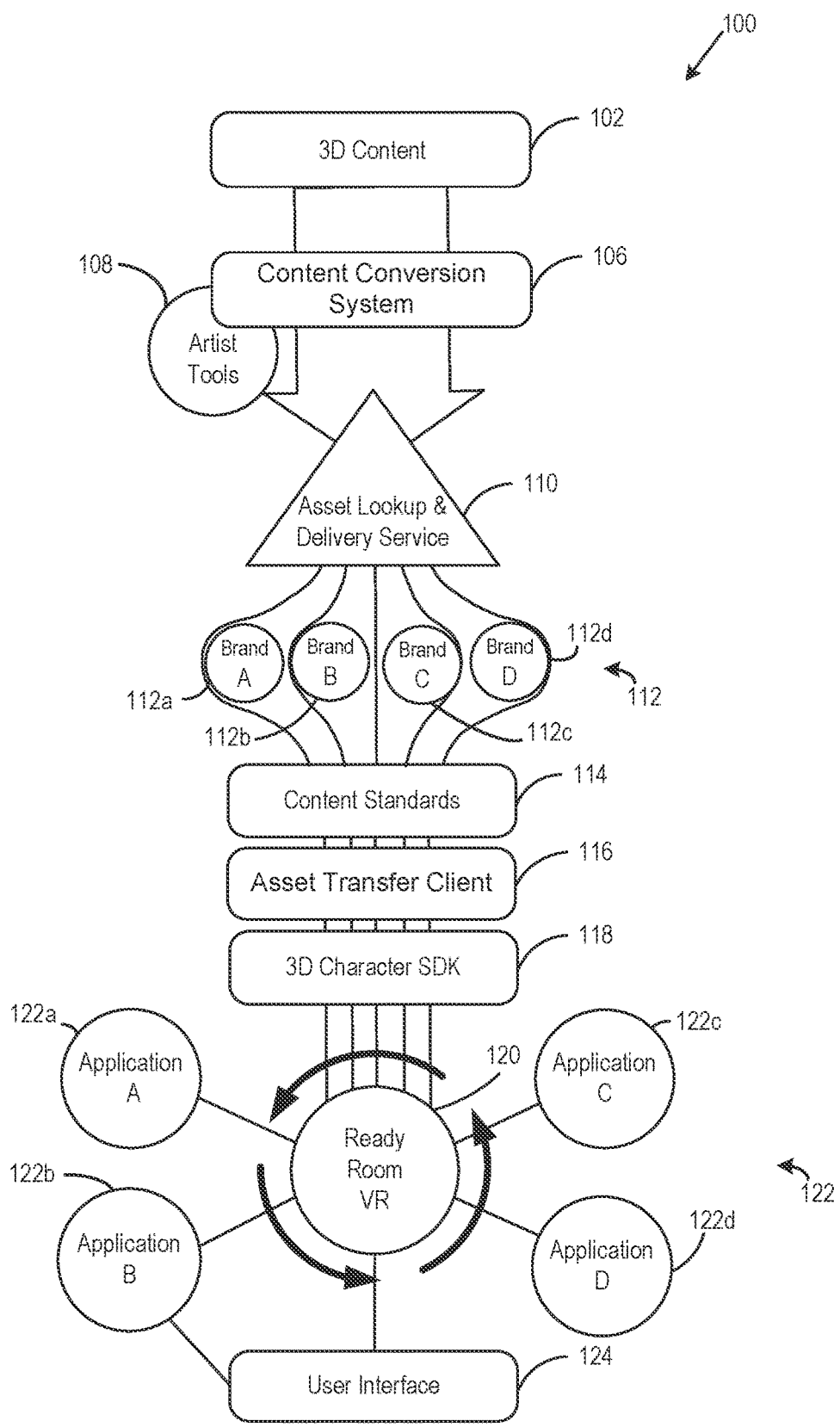
FIG. 1 is a system diagram for a persistent virtual identity system, according to one embodiment.

Individuals are increasingly interacting with computing devices, systems, and environments and with other individuals in electronic or virtual forums, such as in computer games, social media and other Internet forums, virtual/augmented reality environments, and the like, sometimes referred to as cyberspace. These electronic interactions, whether individual-machine interactions or individual-individual interactions, increasingly are facilitated by a concept of virtual identity for each party to the interaction, which may be referred to as an application identity. The virtual identity enables a given party to identify itself to other entities in an interaction and/or enables other parties to recognize or identify the given party during the interaction.

A virtual identity can be embodied as simply as a profile, and be more complex such as including an avatar or other graphical representation, a persona (e.g., an aspect of character of the virtual identity that is presented to or perceived by others), and/or a reputation (e.g., beliefs or opinions that are generally held about the virtual identity). In virtual reality (VR) applications, virtual identity can be very complex to provide a fuller, richer identity to other entities in VR encounters or other interactions. A virtual identity can be used to associate application data with a user. For example, a virtual identity can be used to correlate user data, application settings, pictures, and/or profiles with users, among other types of application data.

Presently, virtual identities are limited to a single application (e.g., specific to a given application and nontransferable to other applications). That is, a user may create a virtual identity for a given application and that virtual identity is not portable to or persistent in a different application. A user must create a separate virtual identity to use with each of a plurality of applications. As such, the user may have the burden of managing and/or maintaining a plurality of virtual identities. If the user experiences a change (e.g., a change of name, address, phone number, or the like), then the user may have the burden of propagating the change through a plurality of virtual identities, each corresponding to a different application.

As virtual identities grow more complex and detailed (e.g., including greater amounts of information) the burden on a user may be further enhanced. For example, if the application identity is associated with a virtual application having a visual aspect, then the virtual identity may include a virtual avatar and other types of data associated with the virtual identity. A user may create, manage, and/or maintain a different virtual avatar for each of a plurality of virtual applications. If a user makes a change to an avatar associated with one virtual identity (e.g., a change of hair color), the user would need to then make the same change to the avatar associated with each other virtual identity in which the user may interact. In other words, if a user wants consistent (e.g., identical or similar) virtual identities across multiple applications, then when the user changes the hair color of an avatar for a given virtual identity in one application the user will also have to make that same change for all other applications in which the user desires the corresponding avatars and/or virtual identities to be consistent.

A persistent virtual identity (e.g., avatar, persona, reputation, etc.) that is portable across applications and/or platforms may be desirable. In some embodiments of the present disclosure, a single persistent virtual identity can be created, managed, and maintained for (and may be portable to) a plurality of applications and/or virtual environments.

As used herein, an application can be a standalone computer program with possible online components. A platform can be a group of different applications or services that provide a broader service that is heavily tied around an online component. A persistent virtual identity can be developed and/or employed in multiple applications and/or platforms.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a system 100 diagram for a persistent virtual identity system according to one embodiment. The system 100 can include 3D content 102, a content conversion system 106, artist tools 108, an asset lookup and delivery service 110 (and/or library), content standards 114, an asset transfer client 116, a 3D character SDK 118, and a ready room in virtual reality (VR) 120. The system 100 can also include brand modules 112a, 112b, 112c, and 112d (sometimes referred to generally and collectively as "brand module(s) 112"). The system 100 can include a plurality of applications 122a, 122b, 122c, 122d (sometimes referred to generally and collectively as "application(s) 122") As can be appreciated, in some embodiments the applications 122 may be on a single common computing platform (e.g., in a common VR environment). In other embodiments, one or more on the applications may be on different, unique computing platforms. A user may interact with the system 100 by way of a user interface 124 that interfaces via the applications 122 and/or the ready room VR 120. The user interface 124 may be or operate on a user computing device. A user of the system 100 may include electronic users, such as a bot or an AI application, in addition to human users.

The system 100 can provide the ability to create and/or maintain a persistent virtual identity and/or a corresponding 3D asset(s), and to enable transport of such between applications (e.g., different games) and/or platforms (e.g., different augmented reality (AR) or VR systems). As used herein, the persistent virtual identity can include a base 3D asset (e.g., an avatar model and modifications thereto), following 3D assets (e.g., clothing, accessories, etc.), history associated with a user of the system, social reputations, social standing, inventory, wardrobe (e.g., additional clothing following 3D assets, which may include pre-saved outfits), and/or trophies, among other items associated with the persistent virtual identity. A virtual identity may include multiple 3D assets, which can include one or more base 3D assets (e.g., multiple avatars) and one or more following 3D assets. The 3D asset(s) can be at least partially defined using geometric data. The 3D asset(s) can further be presented as an avatar associated with the persistent virtual identity. For sake of simplicity, a "3D asset" referenced hereafter may be a base 3D asset, a following 3D asset, or a combination of one or more of these.

The applications 122 can be VR applications. The applications 122 can be independent of each other. The applications 122 can be gaming applications, social media applications, instructional applications, business applications, and/or any other type of application employing VR techniques. The brand modules 112 can provide conformity standards for the applications 122. That is, a 3D asset generated in the system 100 can conform to the standards defined by the brand modules 112 to be compatible with the respective applications 122. The applications 122 may all be on a single platform (e.g., HTC Vive®, Oculus Rift®, PlayStation VR®), or may be on different platforms.

In some examples, the applications 122 and/or the brand modules 112 can be external to the system 100. That is, the applications 122 and/or the brand modules 112 can be implemented independent of the system 100 (e.g., separate and distinct from the ready room VR 120, the asset lookup and delivery service 110, and the content standards, 114, although interfacing or otherwise communicating such as through an API). The applications 122 and the brand modules 112 are correlated. Stated differently, the brand modules 112 correspond to and provide standards, rules, protocols, and/or the like for the applications 122. For example, the application 122a is associated with the brand module 112a, the application 122b is associated with the brand module 112b, the application 122c is associated with the brand module 112c, and the application 122d is associated with the brand module 112d.

The system 100 can enable a persistent virtual identity that is portable and persistent to exist and be transported between the applications 122. A developer and/or a user can integrate or otherwise interconnect with the system 100 (e.g., via applications 122 and/or user interface 124, and generally over a network) to both create a persistent virtual identity, and potentially to interact with other persistent virtual identities created by and corresponding to other users. The user and/or the application developer can exercise control over the created persistent virtual identity. For example, the user can, through the user interface 124, interconnect with the ready room VR 120 to manipulate the virtual identity. The user can also manipulate the virtual identity through applications 122. FIG. 1 shows the user interface 124 interconnected with the system 100 through the ready room VR 120 and the application 122b.

The system 100 can include a three dimensional (3D) character software developer kit (SDK) 118 (e.g., an MCS Plugin). The 3D character SDK 118 may be a library that can be implemented in an application 122. The 3D character SDK 118 includes functionality to perform operations like create 3D assets (e.g., avatars, in a scene), shape them, add/remove clothing and other following 3D meshes, etc. The 3D character SDK 118 also includes functionality to obtain 3D models (for base 3D assets) and accompanying information from the local cache (and if a 3D model and/or accompanying information isn't in the local cache, the 3D character SDK 118 can transparently fetch the 3D model and/or accompanying information from the cloud). The 3D character SDK 118 can also transform 3D models into game ready objects, namely 3D assets. The 3D character SDK 118 can also provide other asynchronous operations, which provides an event or task queue.

The system 100 can also include an asset transfer client 116 (e.g., ready room plugin) and an asset lookup and delivery service 110 (and/or library). The asset transfer client 116 and the asset lookup and delivery service 110 can be local and/or remote to the system 100. That is, the asset transfer client 116 and/or the asset lookup and delivery service 110 can be executed (e.g., hosted) on a network computing device remote to the system 100 that can be accessed by the applications 122. As used herein, the asset lookup and delivery service 110 allows the asset transfer client 116 to request a specific 3D asset with permutations on the request for specific level of detail, material, and texture variation. The asset lookup and delivery service 110 can also provide (e.g., stream) the 3D asset to the asset transfer client 116. As used herein, a material may be a combination of texture files, shaders, and different maps that shaders use (normal map, occlusion map) and other data such as specularity and metallic levels depending on the material type. A material may be a visual layer that makes something within a 3D asset look like more than just polygons.

The asset transfer client 116 can include two or more components remotely located from each other and communicating together, such as over a network. A first component of the asset transfer client 116 can be implemented in the user interface 124 and/or the applications 122. A second component of the asset transfer client 116 can be implemented in the system 100. The first component of the asset transfer client 116 can communicate with the second component of the asset transfer client 116, for example to request a 3D asset. The component of the asset transfer client 116 implemented in the system 100 can request or otherwise obtain the 3D asset from the asset client lookup and delivery service 110.

The system 100 can also include the content standards 114 which includes standards for the brand modules 112 and/or the applications 122. The content standards 114 can specify types of content or groups of content based upon the creator of the asset, the genre of the asset, or the art style of the asset. The content standards 114 can specify types of content or groups of content through the use of filters. The filters can operate on metadata associated with the 3D assets comprising the content or groups of content. The metadata can identify a vendor from which the 3D asset originated, a genre of the 3D asset, and an artistic style of the 3D asset, among other types of data included in the metadata.

A genre can include, for example a fantasy genre, a science fiction (sci-fi) genre, a comic book genre, and/or contemporary genre, among other genres. An artistic style can be defined by vendors who create new artistic styles. The system 100 can have a default artistic style such as a Nikae artistic style and a Minecraft-esque artistic style.

The content standards 114 can also specify what types of 3D assets are allowed in respective applications 122 and/or what types of 3D assets are not allowed in respective applications 122. For example, the content standards 114 can define that 3D assets with a default artistic style and a fantasy genre are allowed in a given corresponding application 122c and that 3D assets of a different artistic style and a different genre are not allowed in the application 122c.

The content standards 114 can also specify that 3D assets originating from a particular vendor are allowed in a corresponding application from the applications 122. For example, the content standards 114 can restrict the transfer of 3D assets to the application 122d to 3D assets that were originated by a vendor of the application 122d.

The content standards 114 can define 3D assets that are restricted from specific brand modules 112 and/or applications 122 to maintain consistent or inconsistent visual effect. The content standards 114 can be implemented in the asset lookup and delivery service 110 to regulate content provided to the applications 122. The content standards 114 can also be implemented in applications 122 and/or the user interface 124 as part of the asset transfer client 116 to regulate content downloaded and cached at the applications 122 and/or the user interface 124.

The artist tools 108, the content conversion system 106, and the ready room VR 120 may be supporting systems to the system 100. Stated otherwise, they may be supplemental and/or ancillary to the system 100, such that they could be implemented separately and distinctly (e.g., on a different computing device, network, or the like) from other elements of the system 100. The artist tools 108 can modify 3D assets to make the 3D assets compatible with the 3D character SDK 118. The content conversion system 106 can convert the 3D content 102 to be performant (e.g., to perform well, such as within performance metrics) for run time applications. The content conversion system 106 can also convert the 3D content 102 to be compatible with the 3D character SDK 118. The 3D content 102 can include, for example, high fidelity photo-real assets and/or low fidelity game-ready assets. The 3D content 102 can be created, for example, by a 3D content creator such as a Daz® 3D application.

The ready room VR 120 can be an application. The ready room VR 120 can be a hub and/or a starting point for persistent virtual identity creation. The ready room VR 120 can also be a default process for moving persistent virtual identities between applications.

The 3D character SDK 118 can enable a base figure (e.g., a base 3D asset representing an avatar that is part of a persistent virtual identity, or other base 3D asset) to be changed into any shape and/or size and retain full functionality for fitting clothing, animating, and/or customizing. Using the 3D character SDK 118, the base 3D asset can be extendable to a potentially unlimited number of variations for creation of a unique avatar. Stated otherwise, characteristics of a 3D asset can be modified in a potentially unlimited number of combinations of variations. Then the system 100 can enable the resultant unique avatar to retain a visual identity across artistic stylings (e.g., if the application 122a implements a first styling, for example a cartoon styling, and the application 122b implements a second styling, for example a realistic styling, then the unique avatar can retain a visual identity as the avatar is shown in a cartoon styling in the application 122a and a realistic styling in the application 122b). The 3D character SDK 118 can include a number of modules and/or services for performing specific operations to modify or otherwise configure characteristics of 3D assets. For example, the 3D character SDK 118 can include a morphing module, a joint center transform (JCT) bone module, a standard shape module, a projection module, a head scanning to a dynamic mesh fitting module, a heterogeneous mesh behavior module, a hair module, and a smart props module.

The artist tools 108 is one or more standalone modules, potentially including computer-readable instructions configured to convert 3D assets to a form/format compatible with the system 100. The artist tools 108 can receive a 3D asset (e.g., geometry), which may be configured in a number of different formats. The artist tools 108 can be configured to group the geometry into items; set up the level of details (LODs) for an item; generate geographical maps (geomaps); add self-defining behavioral information to objects for runtime simulation; set up materials and generate materials for different platforms; configure the geometries' multilayered characteristics for runtime-optimized multilayer depth and volumetric preservation between meshes; and/or set up zones on items for heterogeneous mesh deformation (e.g., so that something like metal deforms differently than cloth to an avatar's shape). As used herein a geomap comprises geometry, a vertex index, and a map outlining an optimized correlation between a following mesh and base mesh to be used for real time calculation and generation of multilayer depth solutions and/or projection solutions. Projection references the act of projecting a deformer from one mesh to another.

The artist tools 108 also set up the custom shaping of a base 3D asset and set up the 3D assets into specific art styles to allow automatic avatar preservation between art styles. The output of the artist tools 108 can be either a single 3D asset and/or a collection of 3D assets which can be compatible with the 3D character SDK 118. The 3D assets modified by the artist tools 108 can be uploaded to the asset lookup and delivery service 110. The 3D assets can further be configured at the asset lookup and delivery service 110 for user specified distribution based upon rules and conditions associated with the 3D asset and as provided by the brand modules 112.

The ready room VR 120 can be a base application that facilitates interaction between a user and the system 100. A base application can be different from the applications 122, such that the base application is a standalone application that can be executed independently from the applications 122. The user can create and customize a 3D asset via the ready room VR 120 using additional content (e.g., following 3D assets) converted with the artist tools 108, made available through the asset lookup and delivery service 110, delivered through the asset transfer client library 116, and passed to the 3D character SDK 118. For example, the user can, via the user interface 124, access the ready room VR 120 to create and/or customize a 3D asset and launch at least one of the applications 122 through the ready room VR 120.

In some examples, the user can create and customize an avatar (or otherwise configure a base 3D asset) via the application 122b. For example the user can access the application 122b and through the application 122b access the ready room VR 120, or functionality of the ready room VR 120 (e.g., to create and customize a 3D asset). Stated differently, functionality of the ready room VR 120 may be implemented or otherwise integrated with the application 122b, such that a user of the application 122b can create and/or customize an avatar or other 3D assets within the a context of the application 122b.

The ready room VR 120 can showcase the core functionality of the system 100 from an end user's perspective. The ready room VR 120 can provide both a place to customize a 3D asset, including an avatar, a shape and/or clothing associated with the 3D asset, and a place to demonstrate the process and/or standards of "walking between applications." The ready room VR 120 provides multiple means to transfer an identity between applications 122, interconnect between multiple open VR applications 122, and incorporate face scan data onto the avatar. The ready room VR 120 can provide different example implementations of a user interface (UI) for shopping, previewing, and/or checking out of stores, among different types of checkout processes.

Once compatible content is acquired, a user can use and customize the 3D asset. A persistent virtual identity for the user can be created, and then the user can activate a mechanism to allow an acquired and/or created 3D asset (e.g., avatar) to transport (e.g., transfer) or step into any one of the applications 122. That is, a 3D asset associated with a user can retain an identity as the 3D asset transitions from the ready room VR 120 into one of the applications 122, and then provide end points for the user to return to the ready room VR 120. The virtual identity of a user, including a corresponding avatar or other 3D asset, can be maintained consistent across multiple applications 122, and as the virtual identity is transported from one application 122, to the ready room VR 120, and/or to another application 122. The 3D asset can also extract and retain items (e.g., a virtual weapon, or other object 3D asset) from the applications 122 that can persist in the ready room VR 120 as the 3D asset transitions from one of the applications 122 into the ready room VR 120 and then to another of the applications 122.

The persistent virtual identity can be associated with, and representative of a user that is external to the system 100. A user can be a human user and/or an automated user.

In some examples, transitioning a 3D asset from a first application (e.g., application 122a) to a second application (e.g., application 122b) can include conforming to standards set by the second application. The standards can include a specific art style and/or theme. Transitioning a 3D asset from a first application to a second application can include placing the 3D asset in a VR room (e.g., lobby) of the first application 122a where the user and/or the 3D character SDK can initiate the required changes to the 3D asset before fully transitioning the 3D asset to the second application.

The transfer of 3D assets between applications includes configuring a 3D asset so that the 3D asset's customizations are retained as the 3D asset transitions from one application to a different application, such that the settings and status of the 3D asset remain the same. The transfer of 3D assets is one example of a persistent virtual identity. The transfer of 3D assets can be accomplished by utilizing a local backdoor module and/or a remote restore module. These modules enable the transfer of an identity between applications 122.

The local backdoor module can include an application 122a calling the asset transfer client 116 to export a 3D asset (e.g., a 3D asset file) and/or a persistent virtual identity (e.g., an identity file) comprising geometry, skinning, rig, textures, materials, and shaders of the current 3D asset with associated items in use, and/or any additional metadata describing the 3D asset and/or persistent virtual identity. After the export is finished, the application 122a launches the application 122b with reference to the local identity file, and then shuts itself down. The application 122b can access the identity and request the local identity definition from the asset transfer client 116 and load the identity into the application 122b.

The remote restore module can be configured to cause the application 122a to call the asset transfer client 116 to push the identity definition metadata to the asset lookup and delivery service 110. The application 122a can then launch the application 122b with an identity string, and then shut itself down. The application 122b can request that the asset transfer client 116 call the asset lookup and delivery service 110 requesting the identity string. The application 122b can likewise retrieve metadata associated with the persistent virtual identity. The application 122b can use either local 3D assets (e.g., locally stored) or remote 3D assets (e.g., streamed or otherwise provided or accessed from a remote location) to render the avatar.

In some examples, the asset transfer client 116 can comprise one or more components. For example, the asset transfer client 116 can comprise a client and a server. The client can be implemented in the applications 122 and/or computing devices on which the applications 122 are executing. The server of the asset transfer client 116 can be implemented in the system 100. The client can communicate with the server to transfer a 3D asset from the system 100 to the computing device of the applications 122.

To transfer a 3D asset and/or persistent virtual identity between applications, the user can select a destination application 122b from a source application 122a. Once selected, a gate or portal may be generated within the source application 122a. The source application may portray the gate and/or portal as a visual appearance branded for the destination application 122b. The gate and/or portal may transition the 3D asset and/or persistent virtual identity from the source application 122a to virtual space (e.g., referred to as the "airlock") that is configurable and customized by the destination application 122b (e.g., a destination application vendor and/or the corresponding brand module 112b). The mechanism to trigger the transfer of a 3D asset may include walking and/or other locomotion methods within a VR environment provided by the source application 122a toward the gate or portal of the destination application 122b.

The transferring of the 3D asset and/or the persistent virtual identity from source application to the virtual space through the virtual portal may trigger a VR passport check. The VR passport check compares clothing and/or an art style associated with the 3D asset and/or the persistent virtual identity with vendor specific standards of the destination application 122b. If the 3D asset and/or persistent virtual identity does not conform to the destination application 122b, then the user is provided an opportunity to change clothing, art style, or any other aspect associated with the 3D asset and/or persistent virtual identity, to meet the destination application standards. Once the standards are met, a launch mechanism, through another virtual portal, the pushing of a button, or the act of meeting the standards, will initiate a transfer of the 3D asset and/or the persistent virtual identity between the source application 122a and the destination application 122b.

A set of standards between applications 122 and vendors can be defined. The standards can foster an increased level of persistence and transfer to exist between different applications 122. The standards enable enhanced functionality to allow standard behavior and transfer of assets or mechanics between disparate applications 122. For example, an application agnostic content interchange can be defined to facilitate the association between 3D assets and/or persistent virtual identities and a given application 122*a* (e.g., a source application 122*a*) and the transfer of the persistent virtual identity to other applications 122 (e.g., a destination application 122*b*). Transferring the persistent virtual identity and/or 3D asset can include losing permanence in the source application 122*a* and creating permanence in the destination application 122*b* with a conforming set of behaviors, mechanics, and appearances.

In some examples, face scan data can be associated with a dynamic mesh. Associating scan data with a dynamic mesh can include taking face scan data and changing a base figure, associated with the 3D asset and/or persistent virtual identity, to incorporate the face scan data such that the base figure retains the same mesh topology while retaining functionality for further shaping of the mesh (e.g., making the face narrower, nose larger, ears pointed, etc.).

The face scan data can be placed on a dynamic mesh. The face scan data can be 3D scanner generated and/or photogrammetry generated (e.g., mesh and texture). The face scan data can also be generated using various images and/or other means. Placing the face scan data on a dynamic mesh can deform the base figure associated with a 3D asset and/or persistent virtual identity to match the visual appearance of the face scan data. Placing the face scan data on a dynamic mesh can generate texture to match the face scan data on the base figure associated with the 3D assets and/or persistent virtual identity.

The face scan data can be compared with the base figure to identify where key facial and head landmarks are on both sets of data (e.g., face scan data and base figure and/or base 3D asset). The base mesh associated with the base figure is deformed to the same shape as the face scan data using automated adjustments of existing blend shapes for each key region of the face. In some examples, a new blend shape can be generated for the base figure to match the face scan data. The face scan generated texture can be analyzed and, using key face and head landmarks, the texture can be rebuilt to fit the base figure's UV map. The face scan generated texture can comprise multiple texture files. The multiple texture files can be combined into a single texture file for the head of a base figure. Fitting face scan data to a base figure can be performed using a custom rig and geomap technology to compare and match the base figure mesh to the face scan data. As used herein, blend shaping, morphing, and deforming references a set of data attached to a mesh which contains positional deltas on geometry and bones to allow the mesh to change shape while not changing its fundamental geometry and/or rig.

When configuring an avatar, if there is face scan data associated with the 3D asset and/or the application identity associated with the 3D asset, the ready room VR 120 can associate the face scan data with the 3D asset such that the 3D asset retains the full customization and compatibility of the base figure without any scanned data. As such, a 3D asset can be configured with the face scan data. The face scan data can be provided, by the user, by uploading a mesh to a server associated with system 100 through at least one of a web form or mobile application.

As used herein, the system 100 can be implemented in a single computing device and/or over a plurality of computing devices. For example, each of the components of the system 100 can be implemented using independent computing devices coupled via a network. In some examples, the system 100 can be implemented using cloud services.

Figure 2:
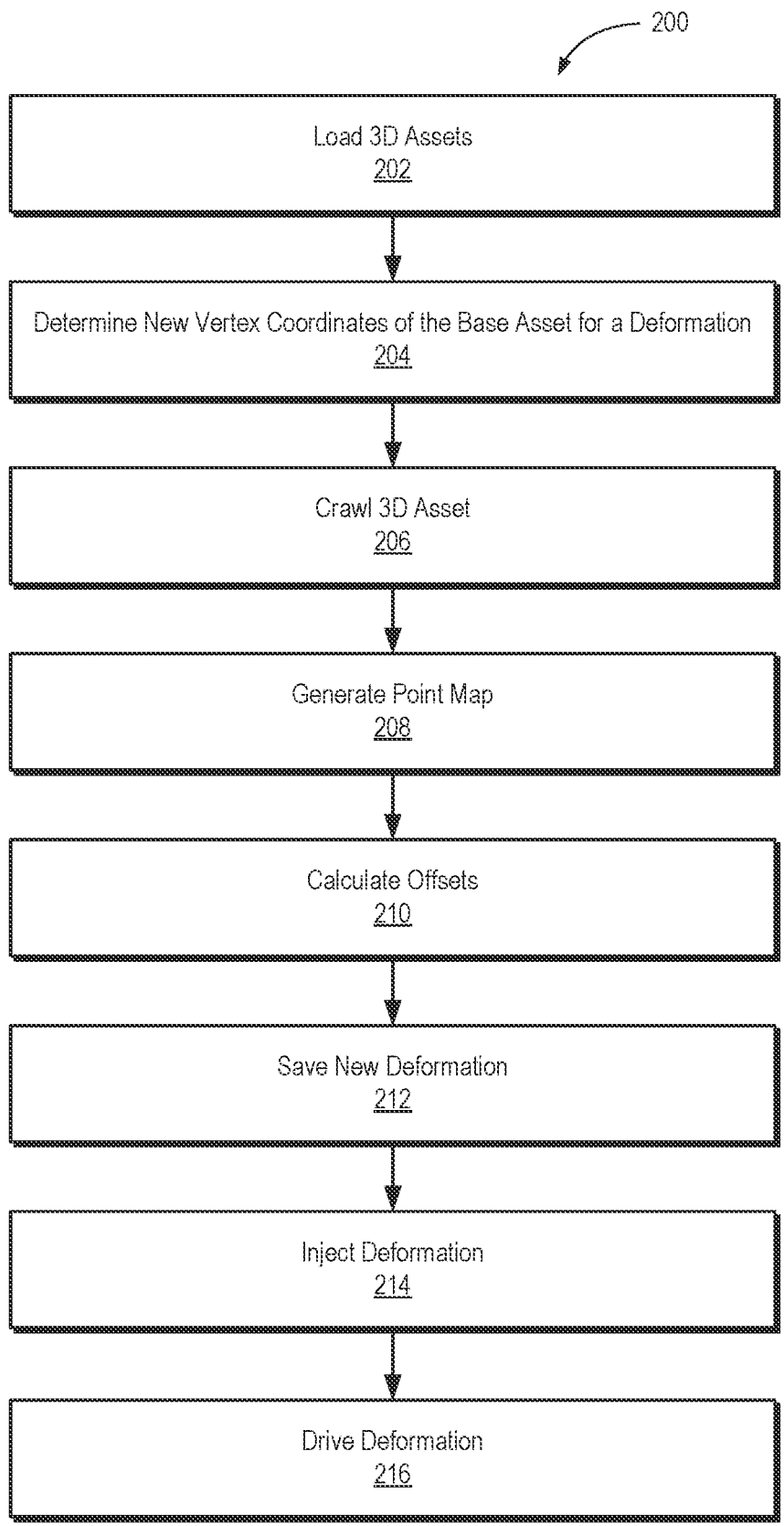
FIG. 2 is a flow diagram of a method for adjusting a following 3D asset based on the deformation of a related base 3D asset.

FIG. 2 illustrates a flow diagram 200 of a method for adjusting a following 3D asset based on the deformation of a related base 3D asset. The 3D character SDK 118 of FIG. 1 may implement this method to enable a base 3D asset (e.g., a 3D asset representing an avatar that is part of a persistent virtual identity) to be changed into any shape and/or size and automatically and near instantly alter the shapes of following 3D assets (e.g., a separate 3D asset associated with the avatar, such as, clothing, weapons, jewelry, and other virtual objects). The automatic and near instantaneous altering of following 3D assets allows the following 3D assets to retain full functionality (e.g., clothing remains fitted to the avatar) as the base 3D asset changes. In some embodiments, the following 3D asset may deform at runtime, allowing the following 3D asset deform along with the base 3D asset. For example, in some embodiments, the deformation may be executed in a single frame of a game which may be less than 10 milliseconds.

As virtual identities become more ubiquitous, individuals desire a greater variety and number of accessories to customize and individualize avatars and express themselves. However, this increases the complexity and detail of virtual identities. Further, any deformation made to an avatar must be permeated to each accessory. For example, if an avatar is changed in size and a shirt the avatar is wearing (associated with) remains the same, the shirt will lose its functionality (e.g., properly covering the avatar). Therefore, it is important that each deformation to the avatar be permeated to each accessory To optimize the adjustment process, the avatar and the accessories may be categorized as a base 3D asset and following 3D assets respectively. The base 3D asset and the following 3D assets may be any related 3D assets. A relationship exists between the base 3D asset and the following 3D asset in that each deformation to the base 3D asset may be proportionally applied to the following 3D asset. This may allow a base 3D asset to be changed in its fundamental shape to any potential shape (e.g., grow taller, shorter, fatter, skinnier, or more muscular), and allow the following 3D assets to continue to work properly in fitting or otherwise associating with the avatar.

A 3D character SDK may implement the method for adjusting a following 3D asset based on the deformation of a related base 3D asset by first loading 202 a base 3D asset and a following 3D asset. Loading 202 the base 3D asset may include receiving vertex index, polygon data, bone data, skinning data, and UV map for the base 3D asset. Loading 202 the following 3D asset may include receiving vertex index, polygon data, bone data, skinning data, UV map, and Geomap data for the following 3D asset.

All of the loaded data may inform the 3D character SDK of relationships between the base 3D asset and the following 3D asset. For example, the Geomap data correlates and indexes key values and relationships between the following 3D asset and the base 3D asset. In one embodiment, the Geomap may be generated and sent to the 3D character SDK by another module, such as the artist tools 108 of FIG. 1.

The 3D character SDK may activate or otherwise perform a deformation on the base 3D asset. Activating or performing a deformation may include determining 204 new vertex coordinates of the base asset for the activated deformation. In one embodiment, a user and/or the system may select a deformation from a list of available deformations already created for the base 3D asset. For example, the list of available deformations may include a height option. If the height option is selected, the 3D character SDK may deform the base 3D asset a preset amount along the Z axes. In a second embodiment, the user or the system may procedurally apply new deformations to the mesh of the base 3D asset. For example, a user interface to an application or the ready room VR may allow a user to manually deform a base 3D asset by selecting a portion of the base 3D asset and modifying the portion with an input tool (e.g., drag and drop with a mouse, stylus, or other input implement) to create the deformation.

The deformation of the base 3D asset creates new vertex coordinates on the X, Y, and Z axes for the base 3D asset. The new vertex coordinates may be determined by the system based on a selection of an available deformation or based on a manual deformation. The new and the original vertex coordinates may be stored in memory before moving the vertex coordinates to apply the deformation. In one embodiment, the original vertex coordinates may become a selectable deformation on a list of available deformations (e.g., revert). Further, in some embodiments, the deformation may also define a bone transformation. If bone transformation data exists for the deformation, the new and the original bone structure coordinates may be stored in memory.

In another embodiment, new X, Y, and Z coordinates for the new bone positions may be generated based on the deformation to the vertices. For example, the 3D character SDK may use the average distance from nearby vertices and a weight map to determine the new bone structure coordinates. The weight map may include data that describe the influence of vertices on each bone structure. The 3D character SDK may calculate an average change in X, Y, Z axes for each vertex and use the weight map to gradate the influence of the vertex in relation to the new bone structure coordinates. The new bone structure coordinates may be an averaged offset based on the gradated average.

The 3D character SDK may perform a 3D asset crawl 206 on the following 3D asset. The crawl 206 of the 3D asset may index the polygon data associated with the following 3D asset. The polygon data may define a polygon that models a portion of the 3D asset. A tree data structure may order the polygon data according to location. The tree data structure may allow for quick access to polygon data concerning each polygon as well as the neighbors of each polygon. Thus the indexed polygon data may be organized by spatial relationships between polygons.

The 3D character SDK may generate 208 a point map. The 3D character SDK may generate 208 the point map based on the geomap, the base 3D asset, and the following 3D asset. The point map represents the relationship between the vertices of the base 3D asset and the vertices of the following 3D asset. Specifically, the point map defines the influence each base 3D asset vertex has on each following 3D asset vertex. The relationship between the base 3D asset vertices and the following 3D asset vertices may be a weighted average based on the distance between the vertices and influence data from the base 3D asset's weight map.

For example, one or more vertices of the base 3D asset may correspond to an ankle of an avatar, and one or more vertices of the following 3D asset may correspond to a pant cuff. When the 3D character SDK generates 208 the point map, the point map will establish that the one or more ankle vertices have a significant influence on the one or more pant cuff vertices. Other vertices of the base 3D asset may have little to no influence on the pant cuff vertices based on distance and a weight map.

The 3D character SDK may calculate 210 offsets created by the deformation for the following 3D asset. Based on the stored new and original vertex coordinates of the base 3D asset, the 3D character SDK may determine which base 3D asset vertices are affected by the deformation. The 3D SDK may then use the point map to determine which vertices of the following 3D asset are influenced by the affected base 3D asset vertices. The amount each base 3D asset vertex influences each following 3D asset vertex (influence scores) may be extracted from the geomap. Based on the influence scores and the distance between the new and original vertex coordinates of the base 3D asset (deformation difference), a set of following vertex offsets and a set of following bone offsets may be calculated.

In one embodiment, the 3D character SDK may calculate the set of following vertex offsets by gradating each deformation difference based on the influence score and aggregating each gradated deformation difference. For example, a first following vertex offset may be calculated by (1) determining which base 3D asset vertex influences the first following vertex offset, (2) determining the deformation difference for each influencing 3D asset vertex, (3) gradating the deformation difference for each influencing 3D asset vertex based on the influence score, and (4) aggregating and averaging the gradated deformation difference. The set of following vertex offsets may be found by calculating the aggregated gradated deformation difference for each following 3D asset vertex affected by the deformation and averaging the aggregated gradated deformation difference. Thus, the 3D character SDK may calculate the set of following vertex offsets by finding a weighted (based on influence score) average of the deformation of influencing 3D asset vertices.

Similarly, the 3D character SDK may calculate the set of following bone offsets by gradating each deformation difference based on the influence score and aggregating each gradated deformation difference. For example, a first following bone offset may be calculated by (1) determining which base 3D asset vertex influences the first following bone offset, (2) determining the deformation difference for each influencing 3D asset vertex, (3) gradating the deformation difference for each influencing 3D asset vertex based on the influence score, and (4) aggregating and averaging the gradated deformation difference. The set of following bone offsets may be found by calculating the aggregated gradated deformation difference for each following 3D asset bones affected by the deformation and averaging the aggregated gradated deformation difference. Thus, the 3D character SDK may calculate the set of following bone offsets by finding a weighted (based on influence score) average of the deformation of influencing 3D asset vertices.

In another embodiment, the 3D character SDK may calculate the set of following bone offsets based on the set of following vertex offsets. For example, the 3D character SDK may use the average distance from nearby following 3D asset vertices and a weight map to determine the set of following bone offsets. The weight map may include data that describe the influence of vertices on each bone structure. The 3D character SDK may calculate an average change in X, Y, Z axes for each vertex and use the weight map to gradate the influence of the vertex in relation to the set of following bone offsets.

A file system may save 212 a new deformation profile of the following 3D asset by storing the set of following vertex offsets and the set of following bone offsets. The deformation profile may be distinct from the following 3D asset. However, to increase computing efficiencies, the deformation profile may be programmatically related to the following 3D asset. For example, the name of the deformation profile may be a unique identifying number procedurally generated from the corresponding base 3D assets deformation, a unique identifier of the base 3D asset, and a unique identifier of the following 3D asset. The unique identifying number may allow the 3D character SDK to identify the deformation profile using a hash-based search.

The deformation profile can be reused. For example, if a certain deformation occurs to the base 3D asset every time the base 3D asset is transferred from a first application to a second application, the following 3D asset may use the saved deformation profile. In one embodiment, the deformation profile can be locally stored deformation file. The file system may store the deformation profile until the base 3D asset, following 3D asset, or geomap data changes. By indefinitely storing the deformation profile, the 3D character SDK may reuse the deformation profile for future deformations of the same nature, thereby saving processing resources.

The 3D character SDK may inject 214 the deformation profile into the following 3D asset as a following blend shape. The process of injecting 214 the deformation profile may form a new object with a unity identity number. The file system may also store a source blend shape. The blend shape may be the deformation applied to the base 3D asset. The unity identity number may map the following blend shape to a source blend shape at runtime. The blend shapes may define maximum offsets for vertices, and deformations may be a percentage of the maximum offsets.

The 3D character SDK may drive 216 the deformation of the following 3D asset. The deformation may begin by calculating the percentage that the base 3D asset has been offset. For example, the percentage may be calculated by comparing the actual deformation offsets with the maximum offsets. Based on that percentage, the 3D character SDK may move the vertices of the following 3D asset. Moving the vertices of the following 3D asset by the same percentage as the base 3D asset may ensure the proper positioning of the following 3D asset.

Similarly, the bones of the following 3D asset may be deformed. The deformation may begin by calculating the new position of each end point of the bones for the following 3D asset and adjust the end points to line them up with the same offsets as the base 3D asset through the JCT service.

While the steps of the flow diagram 200 have been described being performed by the 3D character SDK, other components of system 100 of FIG. 1 may be used to perform one or more of the steps. In some embodiments, the other components may include or reference the 3D character SDK for tools or engines to propagate base 3D asset deformations to the following 3D asset. For example, the asset transfer client may load 202 the base 3D asset and the following 3D asset, and artist tool determines 204 the deformation of the base 3D asset. The content conversion system may crawl 206 the following 3D asset to convert the following asset to be compatible with the 3D character SDK. For example, as part of the conversion process, the content conversion system may index the polygon data associated with the following 3D asset into a hierarchal tree that represents spatial relationships between polygons.

Additionally, the asset lookup and delivery service may allow the asset transfer client to ask for any stored deformation profiles. For example, if a deformation requests that a base 3D asset increase in height, the asset lookup and delivery service may find a corresponding deformation profile of the base 3D asset and the following 3D asset by using a hash-based search.

Figure 3:
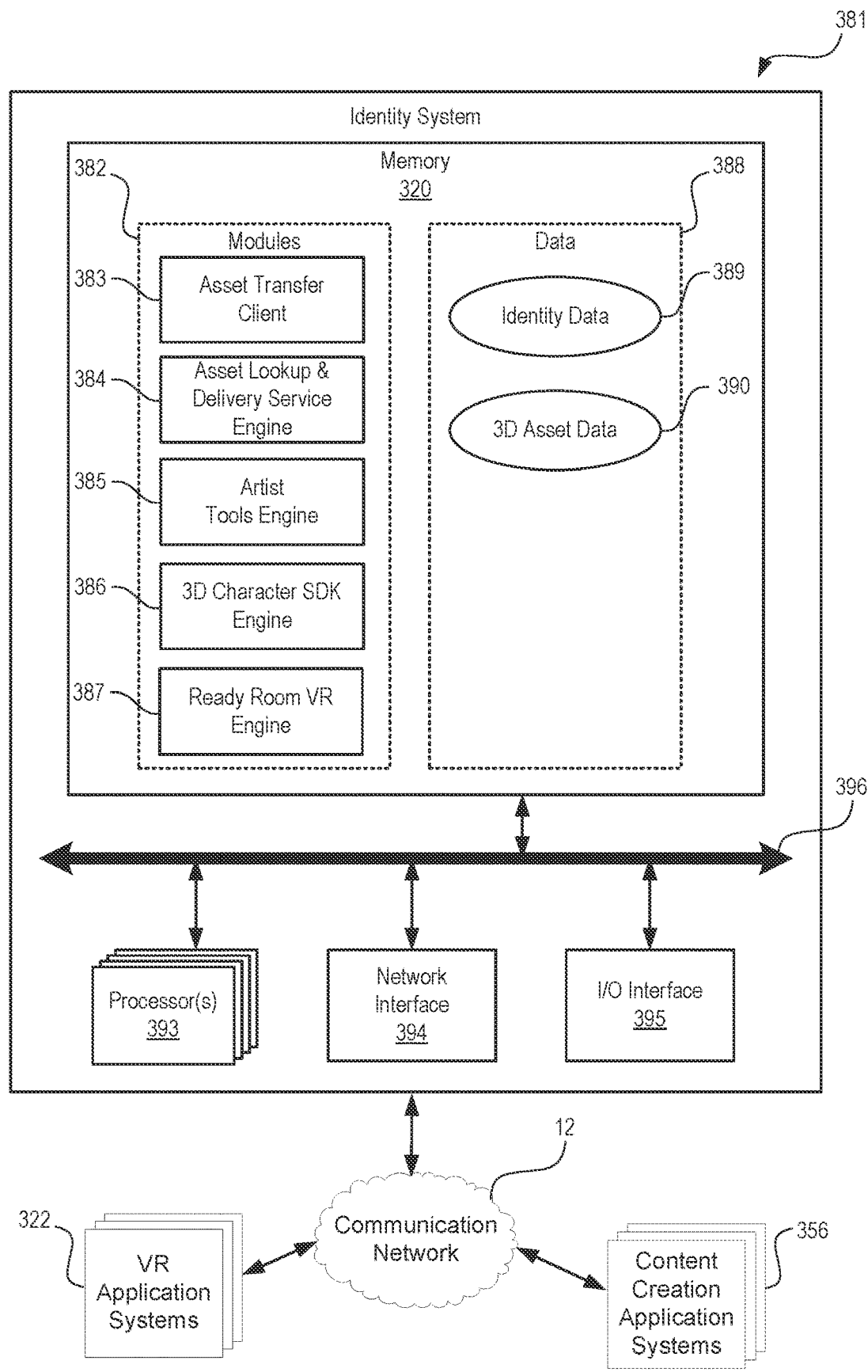
FIG. 3 is a block diagram of a persistent virtual identity system, according to one embodiment.

FIG. 3 is a block diagram of an identity system according to one embodiment The mobile device identity system 381 can generate a persistent virtual identity that can be transferred between applications, potentially on different application systems 322. The identity system 381 can include a memory 320, one or more processors 393, a network interface 394, an input/output interface 395, and a system bus 396. The identity system 381 may be the same as or analogous to the interface system 100 in FIG. 1. The identity system 381 may interface with one or more VR applications 322 via a communication network 12. The identity system 381 may provide persistent virtual identity for the VR application systems 322. The identity system 381 may also interface with one or more content creation application system 356 to obtain 3D assets.

The one or more processors 393 may include one or more general purpose devices, such as an Intel®, AMD®, or other standard microprocessor. The one or more processors 393 may include a special purpose processing device, such as ASIC, SoC, SiP, FPGA, PAL, PLA, FPLA, PLD, or other customized or programmable device. The one or more processors 393 can perform distributed (e.g., parallel) processing to execute or otherwise implement functionalities of the presently disclosed embodiments. The one or more processors 393 may run a standard operating system and perform standard operating system functions. It is recognized that any standard operating systems may be used, such as, for example, Microsoft® Windows®, Apple® MacOS®, Disk Operating System (DOS), UNIX, IRJX, Solaris, SunOS, FreeBSD, Linux®, ffiM® OS/2® operating systems, and so forth.

The memory 320 may include static RAM, dynamic RAM, flash memory, one or more flip-flops, ROM, CD-ROM, DVD, disk, tape, or magnetic, optical, or other computer storage medium. The memory 320 may include a plurality of program engines and/or modules 382 and program data 388. The memory 320 may be local to identity system 381, as shown, or may be distributed and/or remote relative to the identity system 381.

The program engines 382 may include all or portions of other elements of the system 381. The program engines 382 may run multiple operations concurrently or in parallel with or on the one or more processors 393. In some embodiments, portions of the disclosed modules, components, and/or facilities are embodied as executable instructions embodied in hardware or in firmware, or stored on a non-transitory, machine-readable storage medium, such as the memory 320. The instructions may comprise computer program code that, when executed by a processor and/or computing device, cause a computing system (such as the processors 393 and/or the identity system 381) to implement certain processing steps, procedures, and/or operations, as disclosed herein. The engines, modules, components, and/or facilities disclosed herein may be implemented and/or embodied as a driver, a library, an interface, an API, FPGA configuration data, firmware (e.g., stored on an EEPROM), and/or the like. In some embodiments, portions of the engines, modules, components, and/or facilities disclosed herein are embodied as machine components, such as general and/or application-specific devices, including, but not limited to: circuits, integrated circuits, processing components, interface components, hardware controller(s), storage controller(s), programmable hardware, FPGAs, ASICs, and/or the like. Accordingly, the modules disclosed herein may be referred to as controllers, layers, services, engines, facilities, drivers, circuits, and/or the like.

The memory 320 may also include program data 388. Data generated by the system 381, such as by the program engines 382 or other modules, may be stored on the memory 320, for example, as stored program data 388. The stored program data 388 may be organized as one or more databases. In certain embodiments, the program data 388 may be stored in a database system. The database system may reside within the memory 320. In other embodiments, the program data 388 may be remote, such as in a distributed computing and/or storage environment. For example, the program data 388 may be stored in a database system on a remote computing device.

The input/output interface 395 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The network interface 394 may facilitate communication with other computing devices and/or networks and/or other computing and/or communications networks. The network interface 394 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM). Further, the network interface 394 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and so forth.

The system bus 396 may facilitate communication and/or interaction between the other components of the system, including the one or more processors 393, the memory 320, the input/output interface 395, and the network interface 394.

As noted, the interface system 381 also includes various program engines 382 (or modules, elements, or components) to implement functionalities of the system 381, including an asset transfer client engine 383, an asset lookup and delivery service engine 384, an artist tools engine 385, a 3D character SDK engine 386, and/or a ready room VR engine 387. These elements may be embodied, for example, at least partially in the program engines 382. In other embodiments, these elements may be embodied or otherwise implemented in hardware of the system 381. The system 381 also includes identity data 389 and 3D asset data 390 that may be stored in the program data 388 which may be generated, accessed, and/or manipulated by the program engines 382.

Example Embodiments

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. An apparatus for comparative virtual asset deformation system, comprising: memory to store at least two three dimensional (3D) assets, a geomap that correlates and indexes relationships between the 3D assets, and a 3D character software developer kit (SDK) engine, the two 3D assets including at least a base asset and a following asset; and one or more processing units to deform the following asset based on a deformation to the base asset, using the software developer kit (SDK) engine, the processing units to: determine new vertex coordinates of the base asset for an activated deformation, generate a point map defining an influence that vertices of the base asset assert on vertices of the following assets, the point map indicates which vertices of the following asset are influenced by vertices of the base asset with new vertex coordinates for the activated deformation, calculate offsets for the vertices of the following assets that are influenced by determining a weighted average of a difference between the new vertex coordinates and old vertex coordinates of the base asset, and drive the activated deformation to the following asset based on the calculated offsets.

Example 2. The apparatus of example 1, wherein the one or more processing units are further configured to generate new bone coordinates by calculating an average of a difference between the new vertex coordinates and old vertex coordinates of the base asset gradated by influence on affected bone polygons.

Example 3. The apparatus of example 1, wherein the memory further stores a geomap representing relationships between vertices of the base asset and the following asset, and wherein the one or more processing units generate the point map by assigning an influence score to the relationships in the geomap.

Example 4. The apparatus of example 3, wherein the influence score is based on a distance between vertices and data from a weight map associated with the base asset and the following asset.

Example 5. The apparatus of example 3, wherein to calculate the offsets, the one or more processing units: determine a deformation difference for each influencing base asset vertex; gradate; the deformation differences for each influencing base asset vertex based on the influence score; and aggregate and average the gradated deformation differences.

Example 6. The apparatus of example 3, wherein the weighted average is weighted based on the influence score.

Example 7. The apparatus of example 1, wherein the one or more processing units are further to index polygon data associated with the following asset into a hierarchal tree ordered by spatial relations between the polygon data.

Example 8. The apparatus of example 1, wherein the one or more processing units are further to save a deformation profile representing the offsets for the vertices of the following assets.

Example 9. The apparatus of example 8, wherein the deformation profile defines maximum offsets for the vertices of the following asset and the base asset; and wherein the one or more processing units drive the activated deformation by: calculating a percentage comparing offsets from the activated deformation on the base asset from the maximum offsets, and moving the vertices of the following asset by an equivalent percentage.

Example 10. The apparatus of example 8, wherein the deformation profile comprises a following asset blend shape corresponding to a source blend shape.

Example 11. The apparatus of example 8, wherein the following asset blend shape is mapped to the source blend shape.

Example 12. A non-transitory computer-readable medium with instructions stored thereon that, when executed by a processor, cause a virtual identity system to perform operations for propagating a deformation between disparate three dimensional (3D) assets, the operations comprising: determining new vertex coordinates of a base asset for an activated deformation, generating a point map defining an influence that vertices of the base asset assert on vertices of a following assets, determining, via the point map, which vertices of the following asset are influenced by vertices of the base asset with new vertex coordinates for the activated deformation, calculating offsets for the vertices of the following assets that are influenced by determining a weighted average of a difference between the new vertex coordinates and old vertex coordinates of the base asset, and drive the activated deformation to the following asset based on the calculated offsets.

Example 13. The apparatus of example 12, wherein generating the point map comprises assigning an influence score to relationships in a geomap.

Example 14. The apparatus of example 13, wherein the influence score is based on a distance between vertices and data from a weight map associated with the base asset and the following asset.

Example 15. The apparatus of example 13, wherein calculating the offsets comprises: determining a deformation difference for each influencing base asset vertex; gradating the deformation differences for each influencing base asset vertex based on the influence score; and aggregating and average the gradated deformation differences.

Example 16. The apparatus of example 13, wherein the weighted average is weighted based on the influence score.

Example 17. A method for adjusting virtual assets, the method comprising: loading at least two 3D assets, including at least a base 3D asset and a following asset; activating a deformation on the base 3D asset; generating a point map comprising: relationships between vertices of the base 3D asset and vertices of the following 3D asset, and an influence score for each relationship that indicates an amount that the vertices of the base 3D asset influence the vertices of the following 3D asset influences; determining a first set of offsets representing the deformation to the base 3D asset; calculating a second set of offsets corresponding to the first set of offsets, the second set of offsets based on the point map and representing a following deformation to be applied to the following 3D asset when the deformation is applied to the base 3D asset; and driving the following deformation to the following 3D asset.

Example 18. The method of example 17, further comprising saving a deformation profile representing the second set of offsets.

Example 19. The method of example 17, further comprising injecting the deformation profile into the following 3D asset as a blend shape.

Example 20. The method of example 17, further comprising crawling the following 3D asset to index polygon data of the following 3D asset into a tree structure representative of spatial relationships between polygon data on the following 3D asset.

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a software module or component may include any type of computer instruction or computer executable code located within a memory device and/or computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

It will be obvious to those having skill in the art that many changes may be made to the details of the above-described embodiments without departing from the underlying principles of the invention. The scope of the present invention should, therefore, be determined only by the following claims.

The invention claimed is:

1. A system comprising:
memory to store at least two three dimensional (3D) assets, a 3D character software developer kit (SDK) engine, the two 3D assets including at least a base asset and a following asset; and
one or more processing units to deform the following asset based on a deformation to the base asset, using the software developer kit (SDK) engine, the processing units to:

determine new vertex coordinates on X, Y, and Z axes for the base asset for an activated deformation that changes a proportion of one or more portions of the base asset, generate a point map indicating which vertices of the following asset are influenced by vertices of the base asset with new vertex coordinates for the activated deformation, and drive the activated deformation to the following asset by changing coordinates on the X, Y, and Z axes of the vertices of the following asset that are influenced by vertices of the base asset with new vertex coordinates as indicated in the point map such that a proportion of the following asset is changed based on the change in the proportion of the one or more portions of the base asset.

2. The system of claim 1, wherein the one or more processing units are further configured to generate new bone coordinates by calculating an average of a difference between the new vertex coordinates and old vertex coordinates of the base asset gradated by influence on affected bone polygons.

3. The system of claim 1, wherein the memory further stores a geomap representing relationships between vertices of the base asset and the following asset, and wherein the one or more processing units generate the point map by assigning an influence score to the relationships in the geomap.

4. The system of claim 3, wherein the influence score is based on a distance between vertices and data from a weight map associated with the base asset and the following asset.

5. The system of claim 3, wherein the one or more processing units are further configured to calculate offsets for the vertices of the following assets that are influenced based on the new vertex coordinates of the base asset on the X, Y, and Z axes, wherein to calculate the offsets, the one or more processing units:

determine a deformation difference for each influencing base asset vertex; gradate;

the deformation differences for each influencing base asset vertex based on the influence score; and aggregate and average the gradated deformation differences.

6. The system of claim 3, wherein the weighted average is weighted based on the influence score.

7. The system of claim 1, wherein the one or more processing units are further to index polygon data associated with the following asset into a hierarchal tree ordered by spatial relations between the polygon data.

8. The system of claim 1, wherein the one or more processing units are further to save a deformation profile representing the offsets for the vertices of the following assets.

9. The system of claim 8, wherein the deformation profile defines maximum offsets for the vertices of the following asset and the base asset; and wherein the one or more processing units drive the activated deformation by:

calculating a percentage comparing offsets from the activated deformation on the base asset from the maximum offsets, and moving the vertices of the following asset by an equivalent percentage.

10. The system of claim 8, wherein the deformation profile comprises a following asset blend shape corresponding to a source blend shape.

11. The system of claim 8, wherein the following asset blend shape is mapped to the source blend shape.

12. A non-transitory computer-readable medium with instructions stored thereon that, when executed by a processor, cause a virtual identity system to perform operations for propagating a deformation between disparate three dimensional (3D) assets, the operations comprising:

determining new vertex coordinates on X, Y, and Z axes for a base asset for an activated deformation that changes a proportion of one or more portions of the base asset, generating a point map defining an influence that vertices of the base asset assert on vertices of a following assets, determining, via the point map, which vertices of the following asset are influenced by vertices of the base asset with new vertex coordinates for the activated deformation, and driving the activated deformation to the following asset by changing coordinates on the X, Y, and Z axes of the vertices of the following asset that are influenced by vertices of the base asset with new vertex coordinates as indicated in the point map such that a proportion of the following asset is changed based on the change in the proportion of the one or more portions of the base asset.

13. The non-transitory computer-readable medium of claim 12, wherein generating the point map comprises assigning an influence score to relationships in a geomap.

14. The non-transitory computer-readable medium of claim 13, wherein the influence score is based on a distance between vertices and data from a weight map associated with the base asset and the following asset.

15. The non-transitory computer-readable medium of claim 13, further comprising calculating offsets for the vertices of the following assets that are influenced based on the new vertex coordinates of the base asset on the X, Y, and Z axes wherein calculating the offsets comprises:

determining a deformation difference for each influencing base asset vertex;

gradating the deformation differences for each influencing base asset vertex based on the influence score; and aggregating and average the gradated deformation differences.

16. The non-transitory computer-readable medium of claim 13, wherein the weighted average is weighted based on the influence score.

17. A method for adjusting virtual assets, the method comprising:

loading at least two 3D assets, including at least a base 3D asset and a following asset;

activating a deformation on the base 3D asset that changes a proportion of one or more portions of the base asset;

generating a point map comprising relationships between vertices of the base 3D asset and vertices of the following 3D asset;

determining a first set of offsets representing the deformation to the base 3D asset on Z, Y, and Z axes;

calculating a second set of offsets on the X, Y, and Z axes corresponding to the first set of offsets, the second set of offsets based on the point map and representing a following deformation to be applied to the following 3D asset when the deformation is applied to the base 3D asset; and driving the following deformation to the following 3D asset, wherein one or more proportions of the following asset are changed based on the change in the proportions of the one or more portions of the base asset.

18. The method of claim 17, further comprising saving a deformation profile representing the second set of offsets.

19. The method of claim 17, further comprising injecting the deformation profile into the following 3D asset as a blend shape.

20. The method of claim 17, further comprising crawling the following 3D asset to index polygon data of the following 3D asset into a tree structure representative of spatial relationships between polygon data on the following 3D asset.

* * * * *